Patented Dec. 16, 1952

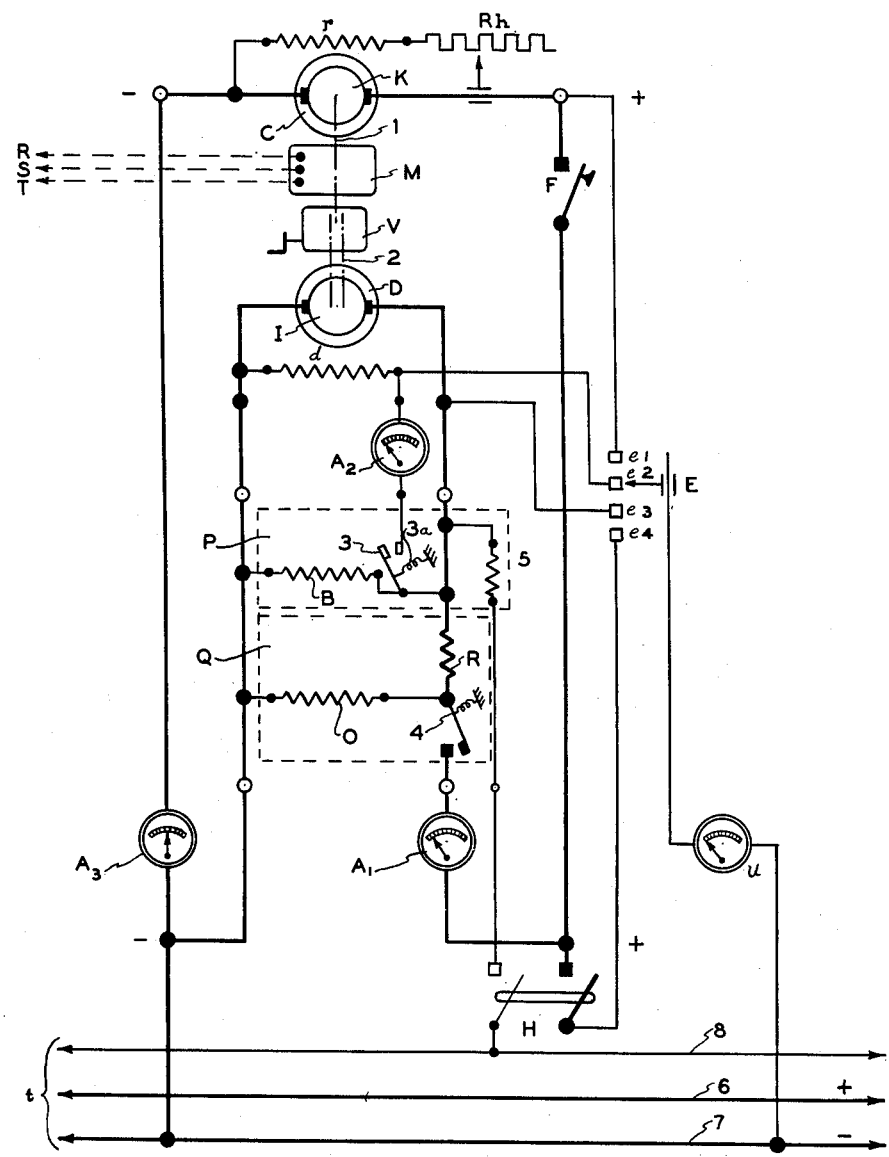

2,622,235

UNITED STATES PATENT OFFICE 2,622,235

DYNAMO TESTING PLANT

Jean François Gabriel Petit, Paris, France, assignor to Societe D'Exploitation De Brevets, Paris, France Application August 6, 1947, Serial No. 766,519
In France September 12, 1945

Section 1, Public Law 690, August 8, 1946
Patent expires September 12, 1965

3 Claims. (Cl. 322—9)

The invention relates to dynamo testing plants of the mechanical loss supply feedback type in which two similar dynamos are directly coupled together and so connected that one acts as a motor and the other as a generator. The motor drives the generator and the output of the generator is fed back to the motor. The two machines are driven at their normal rated speed by means of a suitable source of mechanic power which supplies the losses in the two machines, and they are loaded by setting a difference between the E. M. F. of the generator and the counter E. M. F. of the motor. In the testing plants of this type difficulty is encountered in maintaining a given load on the two machines while varying the operating speed during the test, since a variation of the speed involves a correlative variation of said difference between the E. M. F. of the generator and the counter E. M. F. of the loaded back motor. Constant load operation at varying speeds thus requires controlling simultaneously the field of the generator and the field of the motor. The above difficulty is increased when the machines are to be run at a speed far above their normal rated speed because the field of the motor may become so reduced that the latter operates in the unsaturated portion of its magnetization curve and with its normal amount of armature reaction, which produces a considerable field distortion with the result of a lack of stability of the system. For these reasons the above mentioned plants are used only for testing dynamos which are designed to operate at given speed or over a restricted range of speeds. Some types of dynamos such as engine driven aircraft or automobile generators are designed to operate over a wide range of speeds. For testing them it is generally preferred to use direct loading by means of resistor load banks, which provides simplified manipulation and stable operation. This proceeding however involves a waste of power and the machine to be tested may be beyond the capacity of the source of mechanical power.

It is an object of the invention to provide a dynamo testing plant of the aforesaid type which eliminates the necessity of controlling the field of the loaded back motor for constant load operation under varying speeds thus removing any cause of instability during high speed operation and rendering the test as simple and easy as is the case with a direct loading test.

Other objects and advantages of the invention will become apparent from the following description. The appended drawing given by way of example illustrates a testing plant constructed in accordance with the principles of the invention for the purpose of testing a shunt generator and its accompanying equipment.

Referring to the drawing, M designates an asynchronous driving motor connected across a three-phase supply system, the phase wires of which are RST. The shaft 1 of the motor M, rotating at a substantially constant speed, drives on the one hand a variable speed transmission V and on the other hand the armature K of a direct current auxiliary dynamo C of which $r$ are the field windings and $Rh$ the field-rheostat. The output shaft 2 of the variable speed transmission V drives the armature I of a dynamo to be tested D. The field windings $d$ of this dynamo are connected across the terminals of said dynamo through an ammeter $A_2$ and the contacts 3 of a voltage regulator P which is for example of the vibrating type. This regulator comprises a usual voltage coil B and a neutralizing coil 5. The dynamo D is electrically coupled in opposition with the direct current auxiliary motor C through movable contacts 4 of a make-and-break device Q, having a shunt coil O and a series coil R, an ammeter $A_1$, a switch F, which is preferably a protecting circuit-breaker and an ammeter $A_3$. The said dynamo D is also coupled to positive and negative bus bars 6 and 7 through a switch H so arranged as to allow simultaneously the coupling of the neutralizing coil 5 of the regulator P with an equalizing bus 8. The purpose of said bars 6—7—8 and switch H will be explained hereinafter.

A voltmeter U controlled by a change-over switch E makes it possible to check:

The voltage across the terminals of the direct current recuperating motor C (terminals $e_1$), The field voltage of the dynamo D to be tested (terminal $e_2$), The voltage across the terminals of the dynamo D (terminal $e_3$), The voltage across the + and − bars of the output circuit $t$ (terminals $e_4$).

The regulator P and the make-and-break device Q constitute the accompanying equipment of the generator to be tested. The testing plant herein disclosed permits a simple method of adjusting and testing said regulator and make-and-break device, as will be now described.

The switch F being open, the driving motor M rotating the dynamo D by means of the variable speed transmission V is set in motion. The speed of the dynamo D is increased by acting on the variable speed transmission V, which has the effect of increasing the voltage across the terminals of said dynamo. Said voltage is raised to the desired closing value of the make and brake device Q and the pull of the retracting springs for the contacts 4 of said make-and-break device is so adjusted that closing takes place as soon as the voltage across the terminals of the dynamo has reached the predetermined value.

The switch F still being open, the auxiliary dynamo C operates as a generator, and by acting on the rheostat R$h$ connected in series with the field windings $r$ of the dynamo C, the voltage thereof is regulated to the predetermined value of breaking of the make-and-break device Q.

By closing the switch F, the generator-motor circuit is also closed and, since the E. M. F. of the dynamo D is superior to the counter-E. M. F. of the motor C, a current thus flows in the direction from dynamo O to dynamo C. By gradually decreasing the speed of the dynamo D, by means of the variable speed transmission V the regulator P ceases to regulate the dynamo and the circuit of the shunt winding remains closed; the E. M. F. of the dynamo decreases below the constant E. M. F. of the loaded back dynamo C. Therefore, the current decreases, becomes zero and is reversed until opening takes place. At this instant the maximum value of the reverse current registered by the ammeter A$_3$ is read.

It is thus remarkable that, in consequence of the arrangement disclosed, the loaded-back dynamo C behaves as a generator whose E. M. F. is independent on the speed of the dynamo to be tested; consequently said dynamo C may be used in lieu of a battery, and it is thus possible to conduct the test of the make-and-break device without requiring a battery.

The adjustment of the operating voltage of the regulator P it also effected in the known manner, by acting on the spring system 3$a$ of the movable contacts 3 of the regulator P when the dynamo D is rotating at a substantially higher speed than that corresponding to the closing voltage.

The operating voltage of the regulator P having been adjusted, whatever the speed of rotation of the dynamo D the current flowing between the dynamo to be tested and the loaded back dynamo C remains constant for a predetermined value of the resistance of the rheostat R$h$.

Consequently, in order to increase the load on the dynamo, it is only necessary to decrease the counter-electromotive force E of the auxiliary dynamo C, by increasing the value of the resistance of the rheostat R$h$.

By decreasing the value of said resistance, the counter-electromotive force of the auxiliary dynamo C increases and the load on the dynamo D decreases.

It will be easily noted that it has thus been possible to make a full-load test at any desired speed over the range of the machine to be tested, without it being necessary to reduce the field of the feed-back dynamo below a value which would cause the plant to work in very bad conditions as concerns stability.

If it is desired to test simultaneously a number of dynamos coupled in parallel, the same number of testing plants will be used. In this case the generators are connected to the bus bars 6—7—8, in the same manner as has been disclosed for the plant described above, by means of an equal number of switches such as H.

To conduct the parallel operation test all the switches are closed; the neutralizing coils are then in circuit and tend, as well known, to divide the load between the generators.

Assume that:

$U$=the voltage across the terminals of the auxiliary dynamo C.

$I$=the current passing through the auxiliary dynamo C and dynamo D.

$p$=the efficiency of said dynamo.

$N$=the speed, determined by the driving motor M, at which the whole arrangement is driven.

The power $UI$ absorbed by the auxiliary dynamo C is recovered on the shaft of said dynamo at the value of: $UIp$ and with a torque equal to:

$$\frac{UIp}{N}$$

The purpose of the plant above described is primarily to watch the behaviour of a dynamo under particularly severe operative conditions: high speed, high current intensity, etc.; to know how long it can withstand such conditions without undue heating up, etc. However, the plant may also be completed by any conventional means for measuring the losses and the applied torques, in order to calculate the efficiency of the machine.

Having now described my invention what I claim as new and desire to secure by Letters Patent is:

1. Means for testing a rotary direct current machine having an armature and a field comprising a constant speed motor, a variable speed transmission operatively connecting said motor to said machine for driving said machine at a desired speed, another rotary direct current machine having an armature and a field, means positively connecting said second-named machine to said motor to drive said second-named machine at a substantially constant speed, circuit means connecting the armatures of the two machines in series, and means for adjustably exciting the respective fields of the machines, whereby at times one machine may operate as a generator and the other as a motor.

2. Means for testing a rotary direct current machine having an armature and a field comprising a constant speed motor, a variable speed transmission operatively connecting said motor to said machine for driving said machine at a desired speed, an auxiliary direct current machine having an armature and a field, means positively connecting said auxiliary machine to said motor to drive said auxiliary machine at a substantially constant speed, means for exciting the fields of the machines, means electrically connecting the armatures of the machines to each other, and means for varying the excitation of at least one of said fields to control the current circulating in said armatures at any desired speed of the first-named rotary direct current machine.

3. Means for testing a self-excited direct current generator of the type having an armature, a field, and voltage regulating means controlling the field excitation in accordance with the output voltage of the generator comprising a substantially constant speed motor, a variable speed transmission operatively connecting said motor with said generator for driving the generator at a desired speed, a rotary direct current machine having an armature and a field, adjustable circuit means for exciting the latter field to vary the current therethrough, means positively connecting said machine to said motor to drive the machine at a subtsantially constant speed for producing an electromotive force in the machine which varies in accordance with the variation of field current in said machine, and means electrically connecting the armatures of said generator and said machine, whereby the armature current in the generator may be varied in accordance with the variation of said electromotive force at any desired driven speed of the generator.

JEAN FRANÇOIS GABRIEL PETIT.

REFERENCES CITED

The following references are of record in the file of this patent:

UNITED STATES PATENTS

| Number | Name | Date |
|---|---|---|
| 1,349,371 | Eckmann | Aug. 10, 1920 |
| 1,451,992 | Lee | Apr. 17, 1923 |
| 2,394,131 | Wrathall et al. | Feb. 5, 1946 |

OTHER REFERENCES

"Direct Current Machinery" by Kloeffler, Brenneman & Kerchner, MacMillan Company, 1934, pp. 261–264.

Standard Handbook for Elec. Engineers, 4th edition, McGraw-Hill, New York, 1915, pp. 636 and 637.